(12) United States Patent
Pitcher et al.

(10) Patent No.: US 7,092,205 B1
(45) Date of Patent: Aug. 15, 2006

(54) ISOLATED TRANSDUCER PORTIONS IN MAGNETIC HEADS

(75) Inventors: Carolyn Marie Pitcher, Edina, MN (US); Picheng Huang, Eden Prairie, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 499 days.

(21) Appl. No.: 10/382,038

(22) Filed: Mar. 5, 2003

Related U.S. Application Data

(60) Provisional application No. 60/422,155, filed on Oct. 29, 2002.

(51) Int. Cl.
*G11B 5/147* (2006.01)
(52) U.S. Cl. ...................... 360/126; 360/317
(58) Field of Classification Search ............... None
See application file for complete search history.

(56) References Cited

U.S. PATENT DOCUMENTS

| | | | |
|---|---|---|---|
| 5,283,942 A | 2/1994 | Chen et al. | 29/603 |
| 5,909,628 A | 6/1999 | Chatterjee et al. | 438/424 |
| 6,154,346 A | 11/2000 | Sasaki | 360/317 |
| 6,232,231 B1 | 5/2001 | Sethuraman et al. | 438/691 |
| 6,284,647 B1 | 9/2001 | Chien et al. | 438/633 |
| 6,317,289 B1 | 11/2001 | Sasaki | 360/126 |
| 6,320,726 B1 * | 11/2001 | Sasaki | 360/126 |
| 6,331,471 B1 | 12/2001 | Lee et al. | 438/396 |
| 6,344,409 B1 | 2/2002 | Jaso et al. | 438/633 |
| 6,410,973 B1 | 6/2002 | Iwamatsu et al. | 257/506 |
| 6,432,811 B1 | 8/2002 | Wong | 438/619 |
| 6,477,007 B1 | 11/2002 | Shukh et al. | 360/126 |
| 2002/0012195 A1 | 1/2002 | Lahiri et al. | 360/97.01 |
| 2002/0067570 A1 | 6/2002 | Sasaki et al. | 360/126 |
| 2002/0132468 A1 | 9/2002 | Wong | 438/627 |

* cited by examiner

*Primary Examiner*—Robert S. Tupper
(74) *Attorney, Agent, or Firm*—Kinney & Lange, P.A.

(57) ABSTRACT

A magnetic head having an air bearing surface reads and writes data to and from a disc. The magnetic head includes a substrate and a data transducer positioned upon the substrate adjacent the a bearing surface. The data transducer includes a plurality of metallic layers wherein each metallic layer has a top surface. An isolated transducer portion is isolated from the data transducer and recessed from the air bearing surface. The isolated transducer portion has a top surface wherein the top surface of the isolated transducer portion is positioned coplanar to the top surface of one of the plurality of metallic layers of the data transducer.

16 Claims, 5 Drawing Sheets

ISOLATED TRANSDUCER PORTIONS IN MAGNETIC HEADS

CROSS-REFERENCE TO RELATED APPLICATION(S)

This application claims priority from provisional application No. 60/422,155 filed Oct. 29, 2002, for "Isolated Dummy Features in Magnetic Heads" by Carolyn Marie Pitcher and Picheng Huang.

BACKGROUND OF THE INVENTION

The present invention relates generally to the field of magnetic data storage and retrieval systems. In particular, the present invention relates to an isolated transducer portion within a magnetic head for improved within-wafer chemical mechanical planarization (CMP).

In a magnetic data storage and retrieval system, a thin-film transducing head generally includes a transducer, a substrate upon which the transducer is built, and an overcoat deposited over the transducer. The transducer typically includes a writer portion for storing magnetically-encoded information on a magnetic media and a reader portion for retrieving that magnetically-encoded information from the magnetic media. The reader portion typically consists of a bottom shield, a top shield, and a giant magnetoresistive (GMR) sensor positioned between the bottom and top shields.

The writer portion typically consists of top and bottom poles, which are separated from each other at the air bearing surface of the writer by a gap layer, and which are connected to each other at a region distal from the air bearing surface by a back gap closer or back via. Positioned between the top and bottom poles are one or more layers of conductive coils encapsulated by insulating layers, or a writer core. The writer portion and the reader portion are often arranged in a merged-configuration in which a shared pole serves as both the top shield in the reader portion and the bottom pole in the writer portion.

In the fabrication of magnetic transducing heads, numerous read-write heads are simultaneously constructed, layer by layer, on a single wafer. The wafer is later divided by slicing the wafer into individual read-write heads. The read-write head is built from multiple dielectric or metal layers, which are applied to the wafer surface. The reader includes the bottom and top shields along with multiple, thinner layers. The writer includes the top pole, bottom pole, and coil (single-turn or multi-turn) which is situated near a gap between the top and bottom poles. In addition, electrical leads (usually made of copper) are added to connect the magnetic head to other components.

Multiple features of the read-write head, including but not limited to the shields, poles, coils and electrical leads (commonly referred to as copper studs), require CMP in order to achieve the degree of planarity required to produce magnetic heads which read and write at high areal densities. Two general methods exist for forming and planarizing such features in magnetic heads. One method, known as a damascene process, etches a pattern into a planar, dielectric layer and then fills the pattern with metal. Excess metal is applied over a top surface of the dielectric layer. The excess metal is removed by CMP until the dielectric is re-exposed and the patterned metal surface remains. The second method requires that first, the metal feature be applied to a relatively planar water surface. The metal is patterned via etching, photolithography, milling, and/or methods to form the head features. A dielectric layer is deposited on top of the metal head features so as to cover the features. The oxide coating the top of the head feature is removed via CMP to expose the metal below.

In the field of magnetic heads, the masks of certain planarized layers of the magnetic head have areas of non-uniform pattern density. The non-uniform pattern density of these layers ultimately results in poor post-CMP within-wafer uniformity, however, immediately the non-uniform pattern desnity of the layers results in poor post-CMP within-head uniformity. Poor post-CMP uniformity can impact reader-writer spacing and thermal expansion effects within the head. As the layer planarization (i.e. polishing) takes place, if the density of the head feature layer is not uniform, overpolishing, or dishing, of some of the head features or of the material surrounding the features occurs. The overpolishing results in a thickness variation of the head features across the wafer. Thickness variation impacts the number of read-write heads that perform well across the wafer's surface.

The magnetic head feature densities of the layer in the area to be planarized are typically non-uniform. Thus, when the layer is planarized, valleys in the top surface of the layer result from overpolishing. Because there is less support in the layer areas where the head features are not formed, the material is removed at a faster removal rate, which results in dishing. It is important that the layers of the magnetic head be planar after polishing, however, problems such as dishing occur causing a nonplanar surface. The uneven, or non-uniform, surface impacts reader-writer spacing and performance, and has thermal expansion effects on the magnetic head.

In the semiconductor industry, dummy features isolated from the electrical or magnetic circuits are added to the semiconductor substrate in the wafer build process to improve the post-CMP uniformity. A magnetic head is needed in the art which improves the CMP uniformity of the head features when they are planarized at the wafer level.

BRIEF SUMMARY OF THE INVENTION

The present invention relates to a magnetic head having an air bearing surface. The magnetic head includes a substrate, a data transducer, and an isolated transducer portion isolated from the data transducer. The data transducer is positioned upon the substrate adjacent the air bearing surface. The data transducer includes a plurality of metallic layers wherein each metallic layer has a top surface. The isolated transducer portion is recessed from the air bearing surface. The isolated transducer portion has a top surface wherein the top surface of the isolated transducer portion is positioned coplanar to the top surface of one of the plurality of metallic layers of the data transducer.

DETAILED DESCRIPTION

Figure 1:
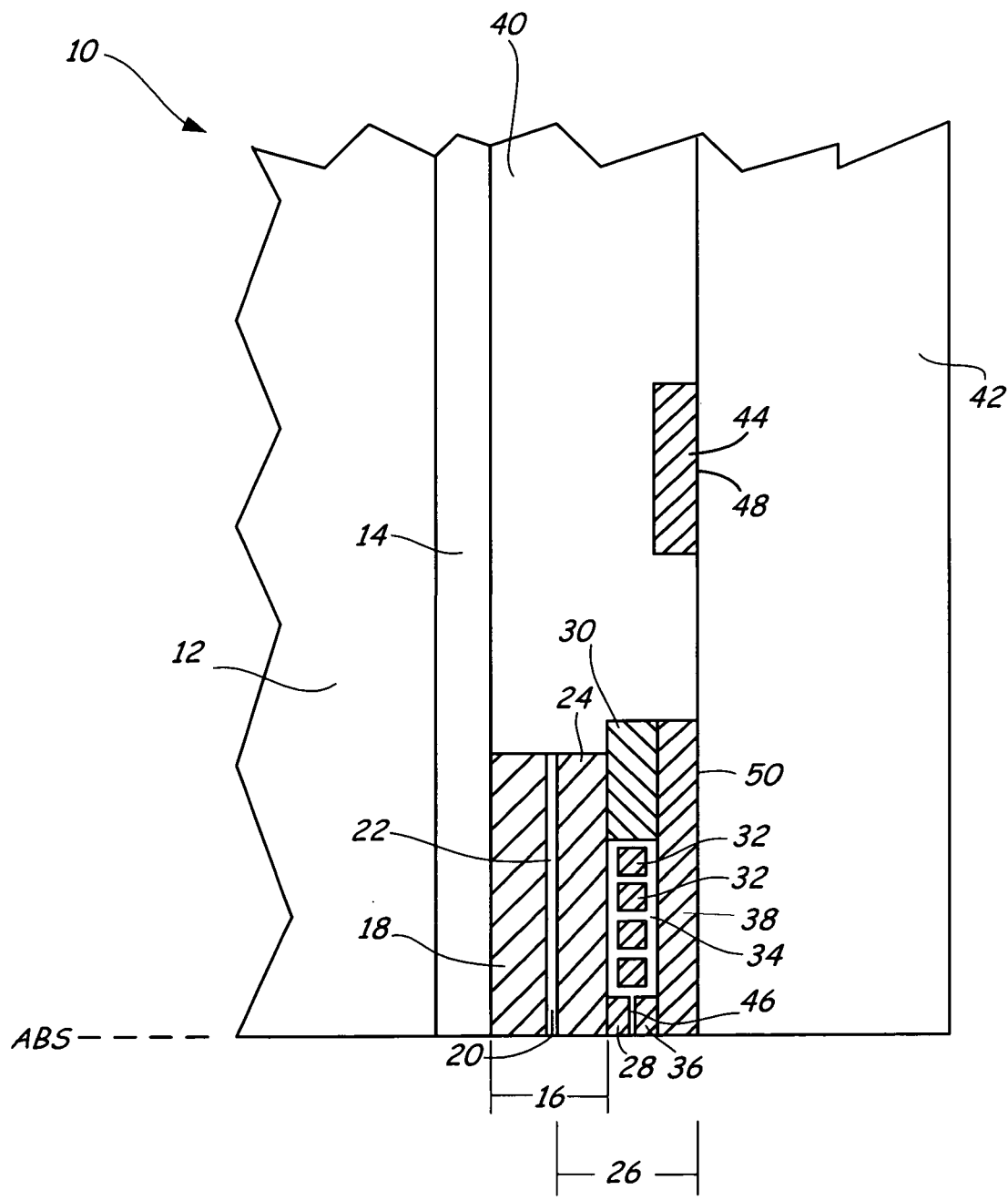
FIG. 1 is a partial cross-sectional view of a transducing head in accord with the present invention.

FIG. 1 is a partial cross-sectional view of a transducing head 10 in accord with the present invention. The cross-section of FIG. 1 is taken substantially normal to an air bearing surface (ABS) of transducing head 10. Transducing head 10 includes a substrate 12, a basecoat 14, a reader 16 (which includes a bottom shield 18, a read element 20, a read gap 22, and a shared pole 24), a writer 26 (which includes shared pole 24, a bottom pole tip 28, a back via 30, a conductive coil 32, a coil insulator 34, a top pole tip 36, and a top pole 38), an insulating layer 40, and an overcoat 42. Included in transducing head 10 is an isolated transducer portion 44 recessed from the ABS and aligned with top pole 38. However, as discussed below and shown in further embodiments, isolated transducer portion 44 may be aligned and associated with other features of transducing head 10, in particular, features of reader 16 and writer 26.

Basecoat 14 is deposited on substrate 12. Reader 16 and writer 26 are each multi-layered devices which are stacked upon basecoat 14 adjacent the ABS of transducing head 10. As shown in FIG. 1, reader 16 is formed on basecoat 14, and writer 26 is both stacked on and merged with reader 16. Shared pole 24 serves as a top shield for reader 16 and a bottom pole for writer 26. In other embodiments not illustrated, reader 16 and writer 26 may be arranged in a piggy-back configuration, in which layers are not shared between the two elements and the top shield of reader 16 and the bottom pole of writer 26 are made of separate layers. Or, writer 26 may be formed on basecoat 14, with reader 16 being formed on writer 26.

Co-planarly positioned with reader 16 and writer 26, and opposite the ABS of transducing head 10, is insulating layer 40. Overcoat 42 is formed on writer 26 and insulating layer 40.

Substrate 12 is typically formed of an electrically conductive, ceramic material such as AlTiC, Si, SiC, $Al_2O_3$, or other composite materials formed of combinations of these materials. Basecoat 14 is formed upon substrate 12 and is generally formed of an insulating material, such as $Al_2O_3$, AlN, $SiO_2$, $Si_3N_4$, or $SiO_{0-2}N_{0-1.5}$. Generally, the insulating material for basecoat 14 is selected to most closely match the chemical and mechanical properties of the material used as substrate 12.

Reader 16 is formed on basecoat 14 and includes bottom shield 18, read element 20, read gap 22, and shared pole 24. Read gap 22 is defined on the ABS between terminating ends of bottom shield 18 and shared pole 24. Read element 20 is positioned in read gap 22 adjacent the ABS. Read gap 22 insulates read element 20 from bottom shield 18 and shared pole 24. Read element 20 may be any variety of different types of read elements, such as an anisotropic magnetoresistive (MR) read element or a giant magnetoresistive (GMR) read element. In operation, the magnetic flux from a surface of a magnetic media causes rotation of a magnetization vector of MR read element 20, which in turn causes a change in electrical resistivity of MR read element 20. The change in resistivity of read element 20 can be detected by passing a current through read element 20 and measuring a voltage across read element 20.

Writer 26 is formed on reader 16, and includes shared pole 24, bottom pole tip 28, back via 30, conductive coil 32, coil insulator 34, top pole tip 36, and top pole 38. Bottom pole tip 28 and back via 30 are formed on shared pole 24, with bottom pole tip 28 being positioned adjacent the ABS and back via 30 being spaced away from the ABS. A write gap 46 is defined on the ABS between bottom pole tip 28 and top pole tip 36. Top pole 38 is formed over top pole tip 36 and extends from the ABS to back via 30. Conductive coil 32 is positioned in coil insulator 34 between shared pole 24 and top pole 38, wrapping around back via 30 such that the flow of electrical current through conductive coil 32 generates a magnetic field across write gap 46.

Head features of reader 16 and writer 26, that is bottom shield 18, shared pole 24, bottom pole tip 28, back via 30, top pole tip 36, and top pole 38, are formed of metallic materials. Preferably, each of these components is formed of an alloy primarily composed of Fe and Ni, or Fe, Ni, and Co. Coil 32 is generally formed of an electrically conductive metal, such as copper, gold, or silver. Read gap 22 and coil insulator 34 are generally formed of an insulating material, such as $Al_2O_3$ or silicon nitride.

Not shown in FIG. 1 are electrical leads and contacts to read element 20 and coil 32. The electric leads and contacts are typically formed of metals and are added to connect transducing head 10 to other components.

Insulating layer 40 is positioned in-plane with layers of reader 16 and writer 26 of transducing head 10, and opposite the ABS. In addition, isolated transducer portion 44 is positioned with insulating layer 40 and in-plane with at least one head feature of reader 16 or writer 26. In FIG. 1, isolated transducer portion 44 is co-planar with top pole 38. Overcoat 42 is formed over top pole 38, the exposed coil insulator 34, and insulating layer 40.

To fabricate transducing head 10, numerous read-write heads are concurrently constructed, layer-by-layer, on a single wafer. After building the heads, the wafer is divided by slicing the wafer into individual transducing heads. Transducing head 10 is built from multiple dielectric or metal layers which are applied to the wafer surface. Reader 16 includes bottom shield 18 and shared pole 24, along with multiple thinner layers. Writer 26 includes top pole 38, shared pole 24, and coil 32. In addition, electrical leads (usually made of copper) are added to connect the magnetic head to other components.

Also constructed during wafer-level fabrication of transducing head 10 is isolated transducer portion 44. Isolated transducer portion 44 is an inactive portion of transducing head 10 which is magnetically and electrically isolated from the reader and writer portions of transducing head 10. Isolated transducer portion 44 is separated from the associated head features of reader 16 or writer 26 feature by a distance between about 50 microns and 165 microns, and most preferably by about 150 microns. However, the separation distance is dependant upon several factors, including head feature material properties and isolated transducer portion material properties. In addition, isolated transducer portion 44 is comprised of the same material as the associated head feature (top pole 38 in FIG. 1) and is formed during the same step during wafer-level fabrication of transducing head 10, as discussed below.

Isolated transducer portion 44 has a thickness which is substantially equal to the thickness of the associated, co-planar head feature. Isolated transducer portion 44 has a top surface 48 which is co-planar with a top surface of the associated, coplanar head feature. For example, as shown in FIG. 1, top surface 48 of isolated transducer portion 44 and a top surface 50 of top pole 38 are co-planar. In further embodiments of the present invention, isolated transducer portion 44 may be associated and co-planar with more than one head feature or there may be more than one isolated transducer portion in transducing head 10. For example, the isolated transducer portion may be co-planar with both back via 30 and top pole 38, or a separate isolated transducer portion may be co-planar with each feature.

Figure 2A:
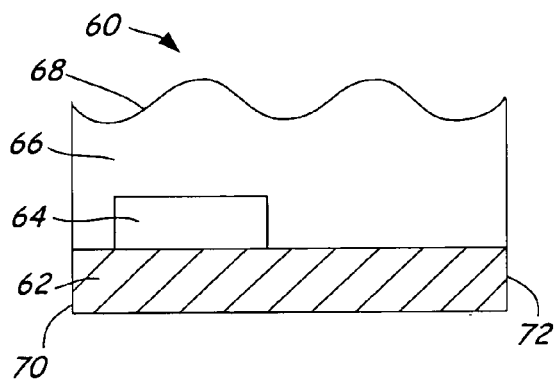
FIGS. 2A and 2B are schematic cross-sectional views of fabrication steps for building a prior art transducing head.
Figure 2B:
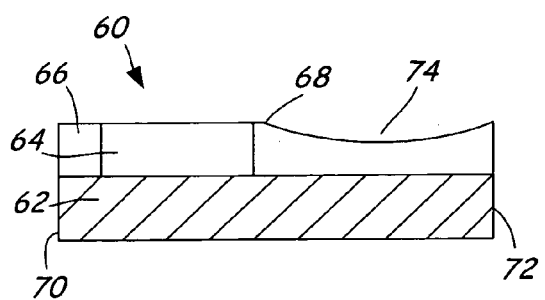

FIGS. 2A and 2B are schematic cross-sectional views of fabrication steps for building transducing heads known in the art. In particular, FIGS. 2A and 2B illustrate a transducing head 60 without an isolated transducer portion. Two general methods exist for forming and planarizing reader and writer features in a transducing head. In a first method, the head features are built upon a relatively planar wafer surface 62. A metallic layer is deposited upon the wafer surface and the metal is then patterned via etching, photolithography, milling, and/or other methods to form a head feature 64 for that layer, such as a pole, shield, coil, or stud. A dielectric layer 66 is deposited on top of the metal head feature so as to cover and surround the feature. A top surface 68 of the dielectric layer does not have an even topography. A chemical-mechanical planarazation (CMP) process is used to even out the top surface of the dielectric layer and expose the head feature.

In prior art transducing heads (as shown in FIGS. 2A and 2B), head feature 64 provides a non-uniform pattern density. Head feature 64 is oriented adjacent edge 70 of the wafer surface, leaving an open area adjacent an opposite edge 72. The non-uniform pattern density of head feature layer 64 results in poor post-CMP within-wafer uniformity. FIG. 2B illustrates transducing head 60 after CMP occurs to expose head feature 64. After CMP, over-polishing, or dishing, results on top surface 68 of dielectric layer 66 (adjacent the open area) which forms a "valley" 74. Because there is less support in dielectric layer areas where head feature 64 is not formed, dielectric material 66 is removed at a faster removal rate, which results in dishing. Dishing may occur to head feature 64 or the surrounding material. The uneven, or non-uniform, surface can impact reader/writer spacing, has thermal expansion effects within the transducing head, and impacts the number of heads that perform well across the wafer surface 62.

A second general method for forming and planarizing transducing head features is a damascene process. In prior art transducing heads, the damascene process also resulted in an uneven, non-uniform planar surface which caused problems with reader/writer spacing and thermal expansion in the transducing head. In a damascene process, a planar, dielectric layer is deposited upon a substantially planar wafer surface. A pattern is etched into the dielectric layer, the pattern defining where the magnetic head feature should be built. The pattern is filled with metal to form the magnetic head feature. Excess metal forms over a top surface of the dielectric layer and is removed by CMP until the dielectric is re-exposed and the pattern and metal surface remains.

Figure 3A:
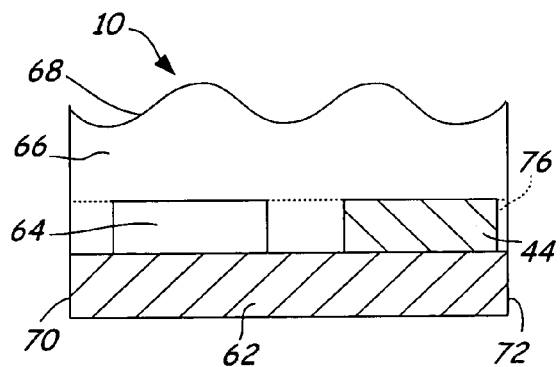
FIGS. 3A and 3B are schematic cross-sectional views of fabrication steps for building the transducing head shown in FIG. 1.
Figure 3B:
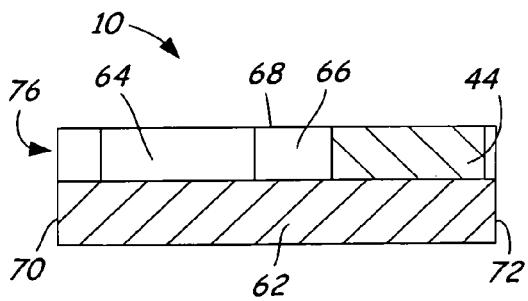

FIGS. 3A and 3B are schematic cross-sectional views of fabrication steps for building transducing head 10 of the present invention. In particular, transducing head 10 includes isolated transducer portion 44. Transducing head 10 includes isolated transducer portion 44 in at least one magnetic head feature layer 76. Isolated transducer portion 44 provides a uniform pattern density, such that during CMP of top surface 68 of dielectric layer 66, dishing does not occur. As shown in FIG. 3A, during fabrication and building of at least one layer 76 of transducing head 10, an inactive portion or isolated transducer portion 44, is patterned into dielectric layer 66, as well as an active portion, magnetic head feature 64. Inactive portion 44 of magnetic head layer 76 is magnetically and electrically isolated from active portion 64. In addition, inactive portion 44 has substantially the same thickness as active portion 64.

Inclusion of inactive portion 44 in magnetic head layer 76 provides a uniform pattern density in the layer, as opposed to the non-uniform pattern density shown in FIG. 2A. During CMP, the uniform pattern density provides additional support in the layer areas where head feature 64 and isolated transducer portion 44 are formed, such that dielectric material 66 is removed at a similar rate. Thus, no dishing results on top surface 68 of the dielectric layer 66, and therefore, no impact on reader/writer spacing and thermal expansion within transducing head 10 occurs. Thus, magnetic head layer 76 is planar after polishing as shown in FIG. 3B.

In the present invention, to improve pattern density uniformity when planarizing a given feature layer in a transducing head, an isolated transducer portion is included and isolated from a co-planar head feature, such as shields, poles, coils or studs. The isolated transducer portion is also referred to as an inactive portion. The isolated transducer portion's sole purpose is to improve the post-CMP uniformity of the wafer as the transducing head is build. The isolated transducer portion is generally formed by the same method and at the same time during fabrication as the associated head feature(s). The isolated transducer portion is also planarized at the same time during fabrication as the head features of a given layer. The isolated transducer portion is generally built to the same pre-CMP height as at least one of the head feature layers with which the isolated transducer portion will be concurrently planarized. The isolated transducer portion remains inactive after CMP and does not perform any magnetic or electrical functions within the transducing head. In addition, the isolated transducer portion does not affect thermal dynamic performance of the transducing head.

Figure 4:
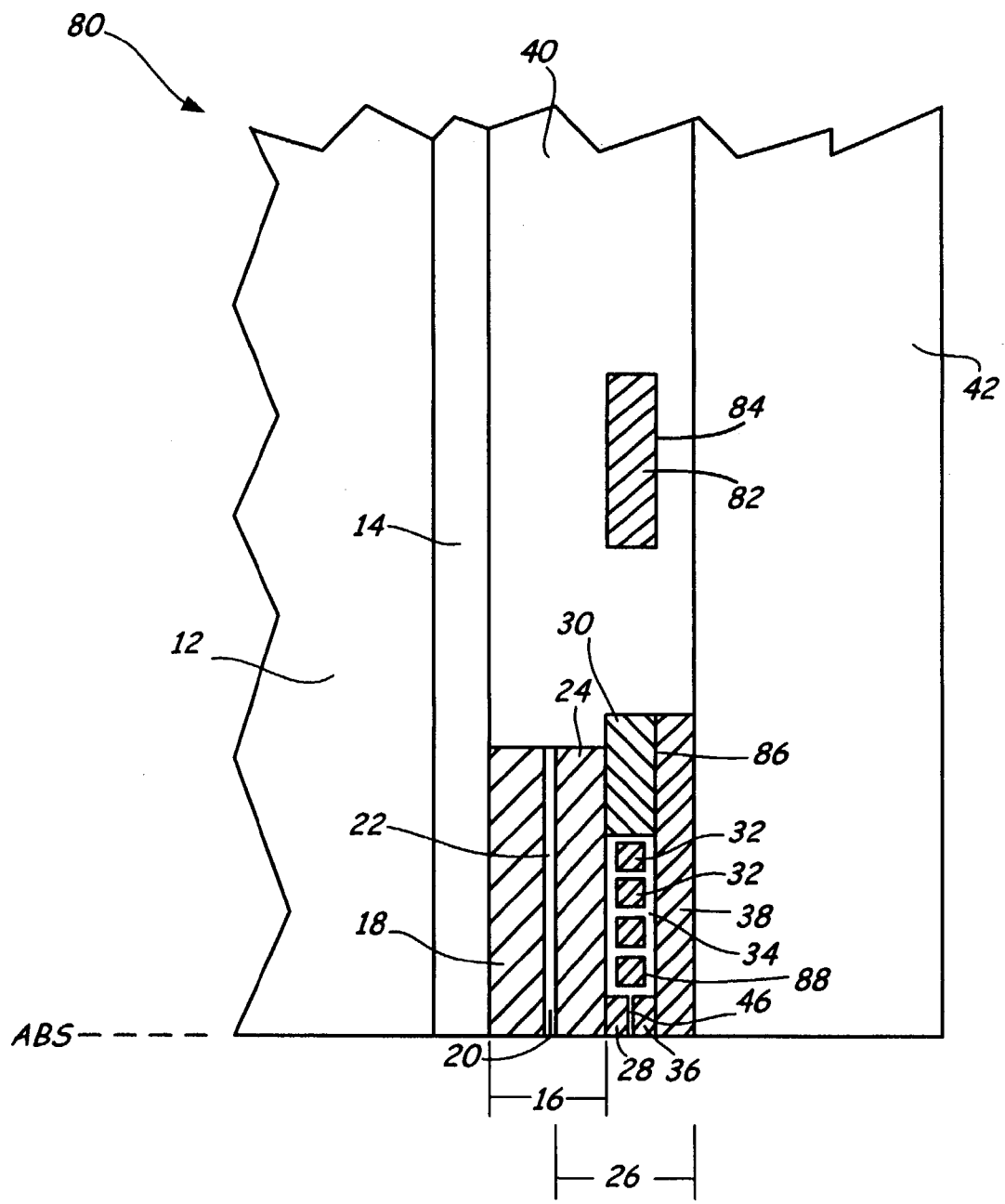
FIG. 4 is a partial cross-sectional view of a transducing head in accord with the present invention.

FIG. 4 is a partial cross-sectional view of a transducing head 80 in accord with the present invention. In FIG. 4, an isolated transducer portion 82 is recessed from the ABS and is co-planar with conductive coil 32 of writer 26 and back via 30. Isolated transducer portion 82 is isolated from conductive coil 32 magnetically and electrically so as to not impact transducing head performance, in particular by a distance between about 50 microns and about 165 microns. A top surface 84 of isolated transducer portion 82 is co-planar with a top surface 86 of back via 30 and coil insulator 34, however, in further embodiments top surface 84 is co-planar with a top surface 88 of coil 32. In addition, isolated transducer portion 82 has a thickness equal to a thickness of back via 30.

Figure 5:
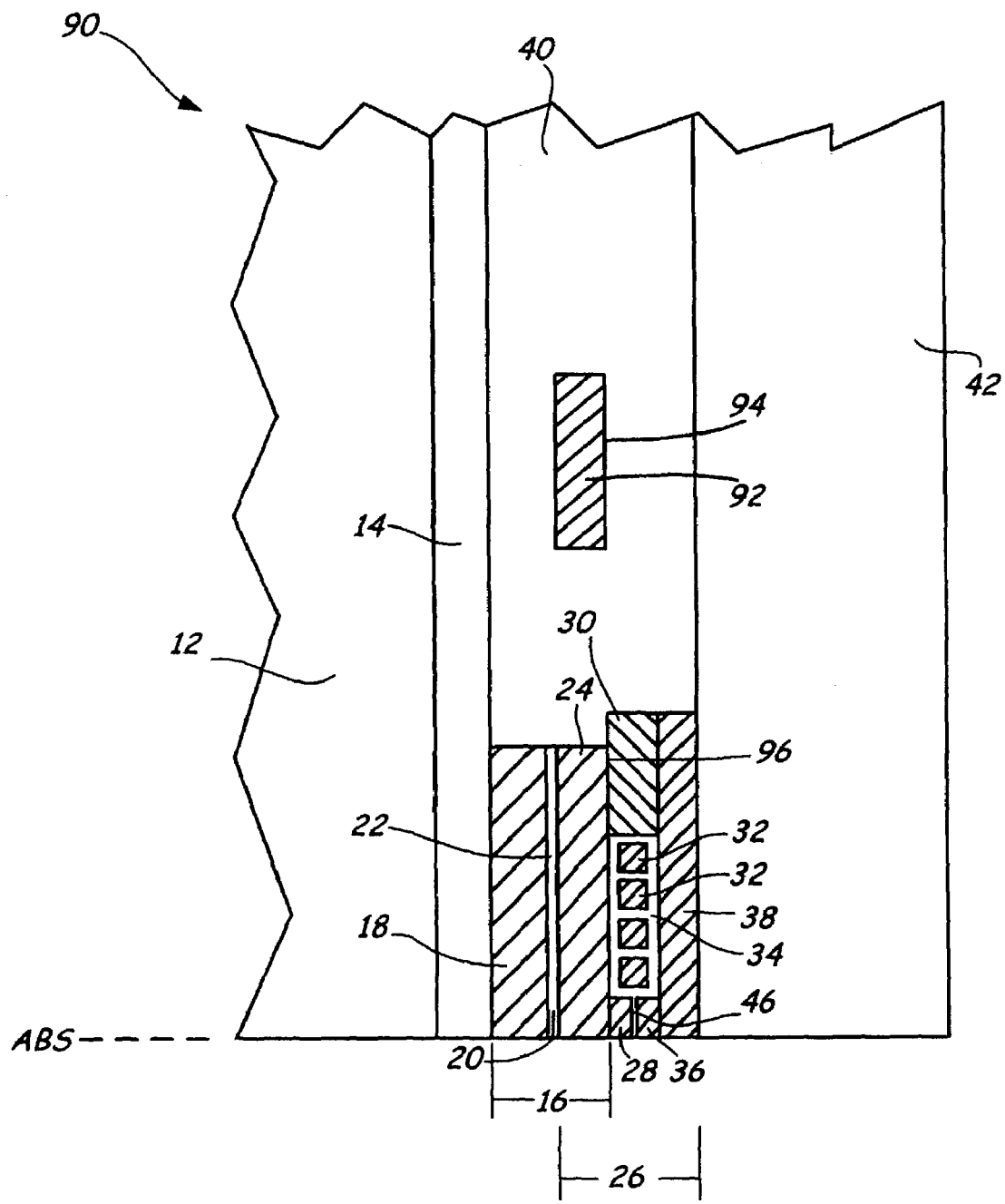
FIG. 5 is a partial cross-sectional view of a transducing head in accord with the present invention.

FIG. 5 is a partial cross-sectional view of a transducing head 90 in accord with the present invention. An isolated transducer portion 92 is recessed from the ABS and is co-planar with shared pole 24. Isolated transducer portion 92 is isolated from shared pole 24 magnetically and electrically. A top surface 94 of isolated transducer portion 92 is co-planar with a top surface 96 of shared pole 24. In addition, isolated transducer portion 92 has a thickness equal to a thickness of shared pole 24, however, in further embodiments, isolated transducer portion 92 may have a thickness greater than the thickness of shared pole 24, as long as top surfaces 94, 96 of the two features are co-planar.

Figure 6:
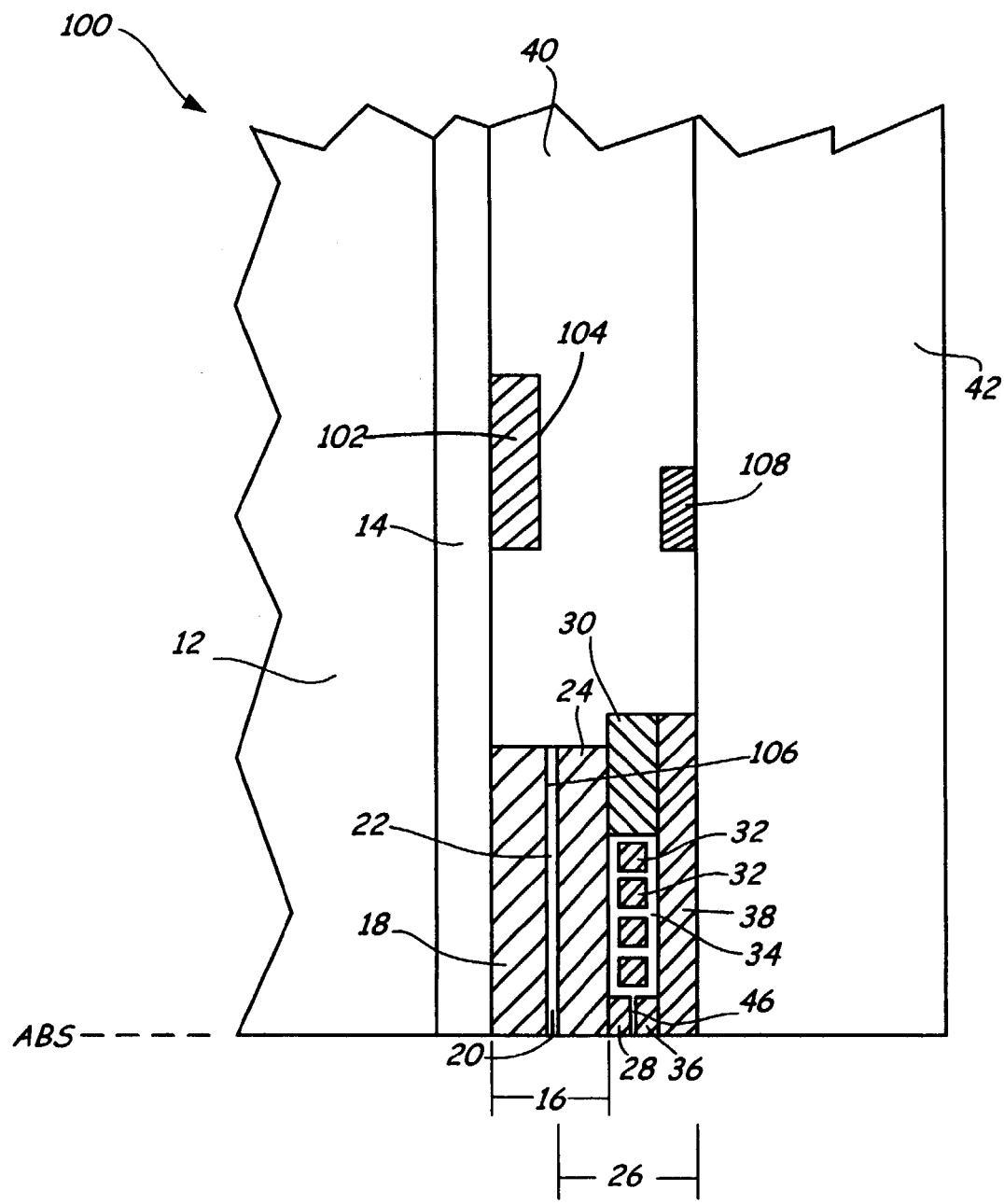
FIG. 6 is a partial cross-sectional view of a transducing head in accord with the present invention.

FIG. 6 is a partial cross-sectional view of a transducing head 100 in accord with the present invention. An isolated transducer portion 102 is recessed from the ABS and is co-planar with bottom shield 18. Isolated transducer portion 102 is isolated from bottom shield 18 magnetically and electrically. A top surface 104 of isolated transducer portion 102 is co-planar with a top surface 106 of bottom shield 18. In addition, isolated transducer portion 102 has a thickness equal to a thickness bottom shield 18.

Transducing head 100 shown in FIG. 6, includes a copper stud 108 formed in the writer portion of transducing head 100. Stud 108 is recessed from the ABS and is co-planar with top pole 38. Stud 108 is attached to a write pad and is associated with an electrical lead which attaches the transducing head to further components in a disc drive system (not shown). Further embodiments of the present invention transducing head include an transducer portion which is isolated from and co-planar with either a top shield or a bottom pole (in a piggy-back configured transducing head) or stud 108 associated with an electrical lead.

The present invention is a magnetic head with improved CMP uniformity of the head features after planarization at the wafer level. Improved CMP uniformity is achieved by including an isolated transducer portion in at least one magnetic head feature layer of the transducing head. The isolated transducer portion provides for uniform pattern density in its respective layer such that dishing does not occur during planarization of that layer. The isolated transducer portion is magnetically and electrically isolated from the respective magnetic head features to prevent disruption of magnetic and electrical performance of the transducing head, as well as not affecting thermal dynamic performance of the transducing head. Once the transducing head is built, the isolated transducer portion remains within the head, but is an inactive portion of the head. In further embodiments of the present invention, more than one isolated transducer portion is isolated from the transducing head.

The transducing head is fabricated with the isolated transducer portion included. The method of fabrication includes forming a wafer surface. The plurality of head feature layers are built upon the wafer surface, wherein each layer includes an active portion and at least one head feature layer includes an inactive portion co-planar to and isolated from the co-planar active portion. The inactive portion includes the isolated transducer portion and has a same thickness as the co-planar active portion. Each head feature layer is planarized wherein the inactive portion provides a uniform surface for planarizing the co-planar active portion. The wafer is then divided into a plurality of magnetic transducing heads.

Although the present invention has been described with reference to preferred embodiments, workers skilled in the art will recognize that changes may be made in form and detail without departing from the spirit and scope of the invention. For example, the isolated transducer portions may be non-metallic or spaced closer or further from the associated head feature depending upon the magnetic and electrical properties of the isolated transducer portion and head feature.

What is claimed is:

1. A magnetic head having an air bearing surface and comprising:
   a substrate;
   a data transducer positioned upon the substrate adjacent the air bearing surface, the data transducer comprising a plurality of metallic layers wherein each metallic layer has a top surface; and
   a isolated transducer portion isolated from the data transducer and recessed from the air bearing surface, the isolated transducer portion having a top surface wherein the top surface of the isolated transducer portion is positioned co-planar to the top surface of one of the plurality of metallic layers of the data transducer.

2. The magnetic head of claim 1 wherein the isolated transducer portion has a same thickness as the co-planar metallic layer.

3. The magnetic head of claim 1 wherein the data transducer comprises:
   a bottom shield;
   a shared pole comprising a top shield and a bottom pole;
   a top pole separated from the bottom pole at the air bearing surface by a write gap and in contact with the bottom pole opposite the air bearing surface;
   a conductive coil arranged such that at least a portion of the conductive coil is positioned between the bottom and top poles; and
   a coil insulator positioned between the bottom and top poles for insulating the conductive coil therefrom.

4. The magnetic head of claim 3 wherein the isolated transducer portion is positioned co-planar to the bottom shield and the isolated transducer portion has the same thickness as the bottom shield.

5. The magnetic head of claim 3 wherein the isolated transducer portion is positioned co-planar to the shared pole and the isolated transducer portion has the same thickness as the shared pole.

6. The magnetic head of claim 3 wherein the isolated transducer portion is positioned co-planar to the top pole and the isolated transducer portion has the same thickness as the top pole.

7. The magnetic head of claim 3 wherein the isolated transducer portion is positioned co-planar to the conductive coil and the isolated transducer portion has the same thickness as the conductive coil.

8. The magnetic head of claim 1 wherein the isolated transducer portion is isolated from the metallic layer of the data transducer by between about 50 microns and about 165 microns.

9. The magnetic head of claim 1 wherein the isolated transducer portion is comprised of the same material as the co-planar metallic layer.

10. The magnetic head of claim 1, and further comprising a stud for attaching a write pad wherein the isolated transducer portion is isolated from the stud and the top surface of the isolated transducer portion is co-planar to a top surface of the stud.

11. The magnetic head of claim 1 wherein the isolated transducer portion is mechanically and electrically isolated from the data transducer.

12. A magnetic head having an air bearing surface and comprising:
   a substrate;
   a data transducer positioned upon the substrate and including a plurality of metallic layers, the data transducer comprising:
      a reader positioned upon the substrate and including a portion of the plurality of metallic layers;
      a writer positioned upon the reader and including a portion of the plurality of metallic layers; and
   a isolated transducer portion recessed from and positioned co-planar to one of the plurality of metallic layers of the data transducer, wherein the isolated transducer portion has a same thickness as the co-planar metallic layer and further wherein the isolated transducer portion is magnetically and electrically isolated from the reader and the writer.

13. The magnetic head of claim 12 wherein the isolated transducer portion is recessed from the co-planar metallic layer by between about 50 microns and about 165 microns.

14. The magnetic head of claim 12 wherein the isolated transducer portion and the co-planar metallic layer are comprised of the same material.

15. The magnetic head of claim 12 wherein the isolated transducer portion is positioned co-planar to one of the metallic layers of the reader.

16. The magnetic head of claim 12 wherein the isolated transducer portion is positioned co-planar to one of the metallic layers of the writer.

* * * * *